Mar. 3, 1925.

K. SCHMIDT 1,528,307

PHOTOGRAPHIC PRINTING APPARATUS

Filed April 18, 1921   6 Sheets-Sheet 1

Fig. 1

Inventor:
Karl Schmidt
by James Hamilton
Attorney

Mar. 3, 1925.

K. SCHMIDT 1,528,307

PHOTOGRAPHIC PRINTING APPARATUS

Filed April 18, 1921   6 Sheets-Sheet 3

Inventor:
Karl Schmidt
by James Hamilton
Attorney

Mar. 3, 1925.

K. SCHMIDT

1,528,307

PHOTOGRAPHIC PRINTING APPARATUS

Filed April 18, 1921    6 Sheets-Sheet 5

Inventor:
Karl Schmidt
by James Hamilton
Attorney

Patented Mar. 3, 1925.

1,528,307

UNITED STATES PATENT OFFICE.

KARL SCHMIDT, OF BERLIN, GERMANY.

PHOTOGRAPHIC-PRINTING APPARATUS.

Application filed April 18, 1921. Serial No. 462,275.

*To all whom it may concern:*

Be it known that I, KARL SCHMIDT, a citizen of the German Republic, residing at Berlin, Germany, have invented certain new and useful Improvements in Photographic-Printing Apparatus; and I do hereby declare the following to be full, clear, and exact description of the invention, such as will enable others skilled in the art to which it appertains to make and use the same.

The present invention relates to improvements in photographic apparatus and more particularly in printing apparatus.

It is the general object of the invention to provide a printing apparatus in which the various mechanisms are correlated in a simple manner and afford reliable operation.

For the purpose of explaining the invention an example embodying the same has been shown in the accompanying drawings, in which the same reference characters have been used in all the views to indicate corresponding parts. In said drawings, Fig. 4, is a side view seen from the left in Fig. 1, Fig. 5, is an enlarged detail view seen from the front side of the apparatus and showing the web feed rollers and the cams and slide bars for operating the mechanism for lifting the web of paper into contact with the negative and for removing the shutters covering the negative and exposing the same to the light, Fig. 6, is a horizontal section of Fig. 5, Fig. 7, is a view of the parts shown in Fig. 5, seen from the rear of the apparatus, Fig. 14, is a plan view of Fig. 13, Fig. 15, is a detail view showing one of the bars carrying the web roll.

In the example shown in the figures the improved printing and developing apparatus comprises a casing 1 having legs 2 and supported on a frame 3. On the said frame a motor 4 and a belt gearing 5 are mounted, which are in driving connection with the operative parts of the machine.

Figure 3:
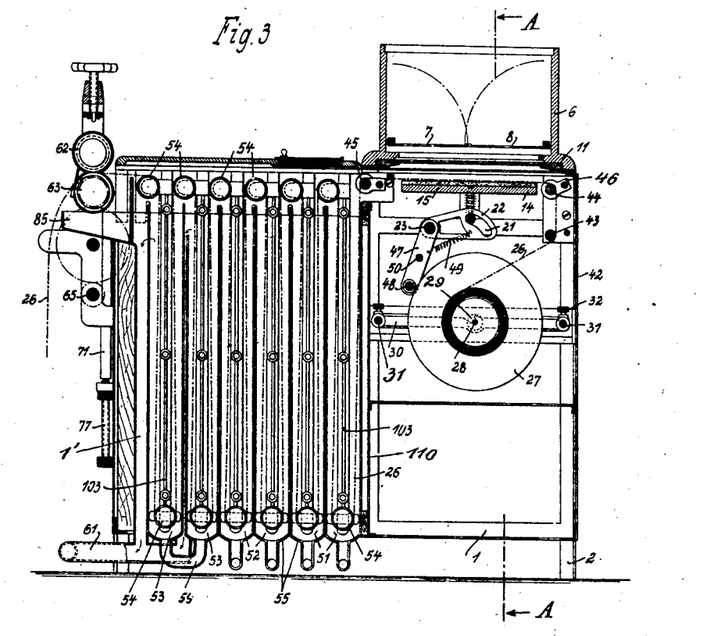
Fig. 3, is a vertical section of the upper part of the apparatus.
Figure 4:
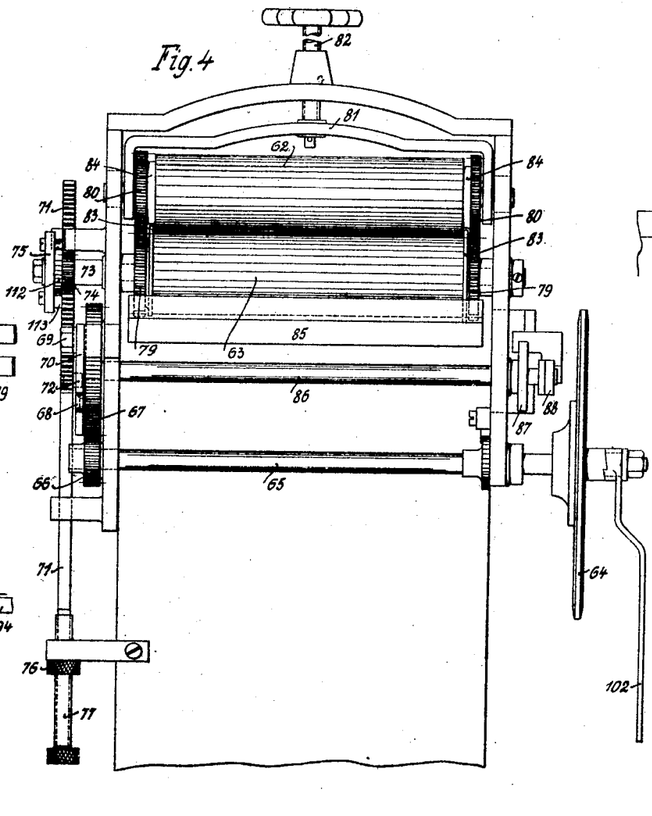
Figure 5:
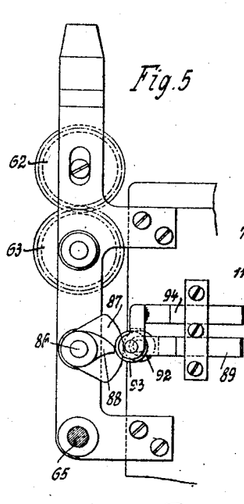
Figure 6:
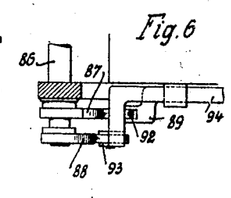
Figure 7:
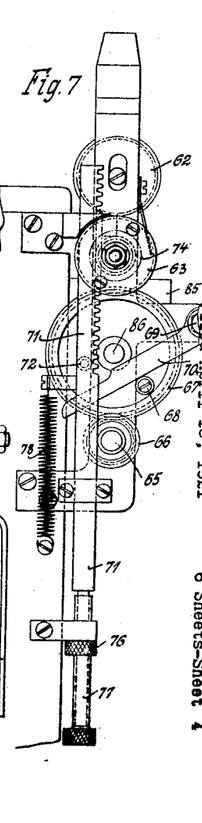
Figure 8:
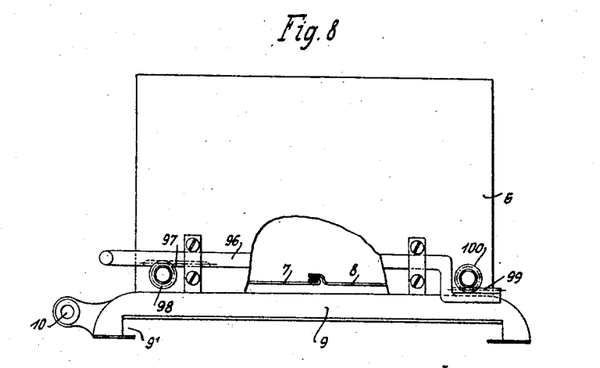
Fig. 8, is a front view of the box supporting the negative holder and showing a part of the mechanism for operating the shutters covering the negative.
Figure 16:
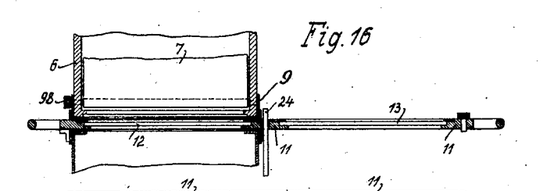
Fig. 16, is a vertical cross-section showing the negative holder and the box supporting the same.
Figure 17:
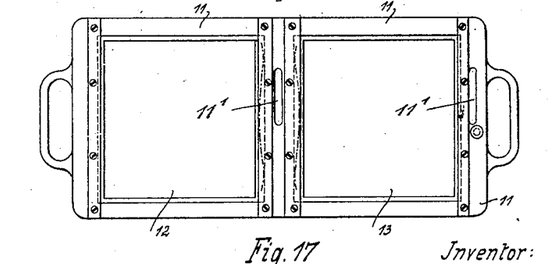
Fig. 17, is a plan view of the negative holder.

The casing 1 is closed all around so as to exclude the light and within the same there are the various devices such as a roll from which the web of sensitized paper is taken, mechanism for lifting a part of the web into contact with the negative for printing, the guides for the web, and the means for developing, fixing and washing the sensitized web. On the top wall of the casing there is a box 6 which is open at its top and bottom, and which is adapted to expose the negative and the portion of the web in contact therewith. As shown the said box is equipped at its lower part with a pair of hinged shutters or blinds 7, 8 adapted to be rocked upwards and into exposing position, as is best shown in Figs. 3 and 8. The box is mounted on a frame 9 which is mounted on an axis 10 for being rocked upwards and into the position shown in Fig. 1 in dotted lines. The frame 9 is formed with lateral guide ways $9^1$ for a negative holder 11. As appears more particularly from Figs. 16 and 17 the said holder consists of a frame having two windows 12 and 13 and adapted to receive two negatives at a time, and it is slidable in suitable guide ways so that either one of the negatives can be set in printing position. The negatives are placed within the frame 11 with the film side directed downwards, so that the sensitized paper can be pressed in direct contact with the film.

As the light must pass through the whole area of the negative, the negatives bear only with their margins on the frame 11, or they bear with their whole surfaces on glass plates disposed within the frame 11.

Below the box 6 a window is made in the top wall of the casing 1 and below the said window a table 14 is mounted for reciprocating in vertical direction, which table is covered with a suitable soft material 15 such as felt, rubber, or the like. As shown the table is secured to a transverse bar 16 the bifurcated ends 17 of which engage vertical guide rails 18 secured to opposite walls of the casing 1. To the bar 16 two bolts 19 are secured which depend downwards therefrom and pass through holes made in a transverse bar 20, and on the said bolts there are coiled springs 21 which bear with their lower ends on the bar 20 and with their upper ends on the bar 16. The transverse bar 20 is engaged by cam slots 21' made in two cam disks 22 keyed to a rock shaft 23 mounted in and projecting through the front and rear walls of the casing 1. To one of the projecting ends of the shaft 23 an arm 24 is keyed which is adapted to lock the frame 11 in position with one or the other of its windows in printing position and which for this purpose engages in one or the other of two slots $11^1$ of the said frame. To the opposite end of the rock shaft a gear wheel 25 is keyed by means of which the shaft and the cam disks 22 are rocked to and fro for imparting reciprocating movement to the tables 14, 15.

Below the table 14 the roll 27 is located from which the web of sensitized paper is taken. As shown the roll is mounted on a spindle 28 bearing in sloping notches 29 made in two rails 30. The rails provide lateral guides for the rolls and they are mounted on rods 31 for being adjusted longitudinally of the spindle 28 to accommodate rolls of different lengths. For fixing the rails in set positions suitable means such as set screws 32 are provided. The rods 31 are secured to rails 33 which are longitudinally shiftable on rails 34, and the rails 33 and 34 are guided between cleats 35 secured to opposite walls of the casing 1. To each of the rails 33 a plate 36 is riveted which depends downwards therefrom and laterally of the rail 34 and which cooperates with lugs 37 and 38 formed on the rail 34 for carrying the rail 34 along when retracting the rail 33 from the casing and for shifting the same inwards when pushing the rail 33 into the casing. The rails 34 are connected by transverse rods 39 so as to provide a frame which is retracted from the casing for putting in a new roll and is pushed into the casing with the new roll placed thereon. To arrest the frame when retracting the same from the casing stops 40 and 41 are provided respectively on the rails 34 and 35. To permit insertion of a roll the casing 1 is provided with a light-tight door 42, as is shown in Fig. 3.

Figures 10, 11, 12:
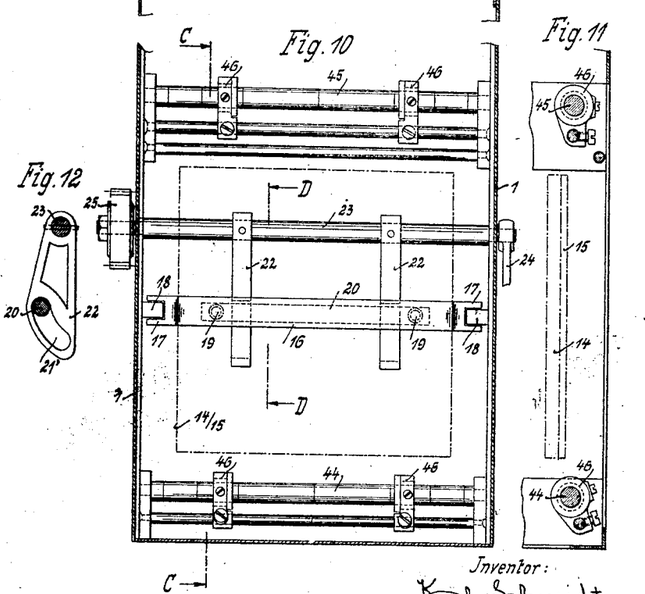
Figure 13:
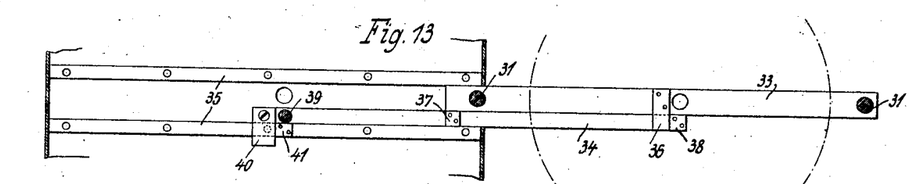
Fig. 13, is a detail view showing the slide supporting the web roll.
Figures 14, 15:
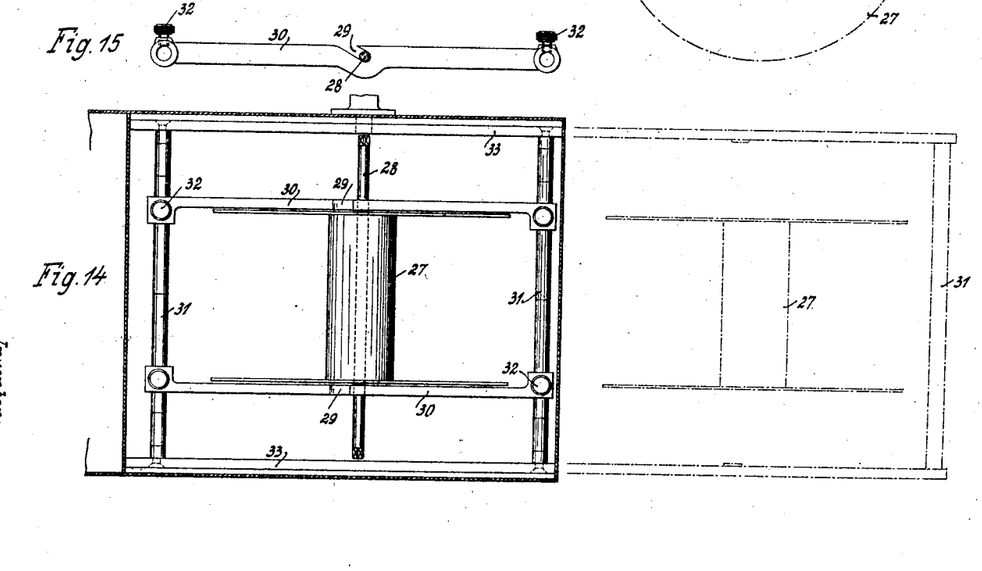

The web is taken from the roll by means of a pair of feed rollers 62 and 63 and it is trained on guide rods 43, 44 and 45 which are provided with adjustable members 46 for laterally guiding the web, as is shown in Figs. 10 and 11. On the shaft 23 a frame has a rocking support which consists of arms 47, a transverse bar 50 and a roller 48 bearing on one of the flanges of the roll 27 and adapted to brake the rotary movement thereof, springs 49 being attached to the bar 50 and to the cam members 22. Therefore when rocking the cam members upwards for moving the web into printing position the roller 48 is held in braking engagement with the roll.

The part of the casing 1 which encloses the roll 27 is separated from the part 1 by a partition 110 and within the chamber $1^1$ thus provided the developing, fixing and washing apparatus are confined. As shown in Fig. 3, these apparatus comprise six upright dishes 51, 52, 53 through which the web of sensitized paper after exposure is passed upwards and downwards, as is known in the art.

The dishes 51 contain the developing bath, the dishes 52 the fixing bath, and through the dishes 53 water is circulated. Within the dishes there are removable frames 103 provided with upper and lower guide rollers 54 for successively passing the web of paper through the dishes. In the preferred construction shown in Fig. 3 the frames 103 are suspended with their upper ends from suitable supporting members provided at the front and rear walls of the casing 1, and they do not bear on the bottoms of the dishes. Thereby the proper positions of the frames 103 with all the rollers 54 parallel to each other is insured, so as to provide uniform guides for the web.

Below the lower guide rollers 54 the dishes are formed with extensions 55 for the reception of deposits from the baths. The dishes 51 and 52 are formed at their bottom parts with tubular portions for connecting flexible tubes 56 thereto which are normally fixed by means of clamping members to the outside of the casing, and which carry funnels 58 at their upper ends. Through the said funnels the liquids are supplied to the dishes and the level of the liquid within the dishes is determined by the position of the funnels. By lowering the tubes 56 the liquid is withdrawn from the dishes. The dishes 53 are connected with each other by a tubular portion 59 and they are connected with a flexible inlet tube 60 adapted to be connected to a water supply and with a common discharge 61.

The feed rollers 62, 63 are provided laterally of the last one of the dishes. When printing the web of paper must temporarily be arrested below the negative. Therefore, the feed rollers 62, 63 are intermittently operated which is done in my improved apparatus by the following mechanism. The gearing 5 is operatively connected with a pulley 64 keyed to one end of a shaft 65 rotatably mounted at one of the sides of the casing 1. To the opposite end of the shaft a gear wheel 66 is keyed which is in engagement with a gear wheel 67 carrying a crank pin 68 located in position for operating a rocker 70 mounted on a pivot bolt 69. In front of the rocker a rack 71 is mounted which is slidable in vertical direction, and which carries a pin 72 adapted to be engaged by the rocker for lifting the rack. The teeth of the rack are in mesh with the teeth of a pinion 74 which is loosely mounted on the shaft 73 of the lower feed roller 63 and which is secured to a ratchet wheel 112. To the shaft 73 a disk 75 is keyed which carries two pawls 113 engaging in the teeth of the ratchet wheel 112. It will therefore be understood that by rocking movement imparted to the pinion 74 the shaft 73 and the feed roller 63 are operated in one direction only. The rack 71 bears with its lower end on an adjustable stop member such as a screw 77 adapted to be secured in position by a nut 76. By setting the screw 77 the stroke of the rack and thereby the length of the feed of the feed rollers can be adjusted.

The gear wheel 67 is uniformly rotated from the motor 4 and through the intermediary of the gearing 5. Thereby the crank pin 68 rocks the rocker 70 upwards, and when moving upwards the rocker carries along the rack 71 and the gear wheel 74. During the upward movement of the rack the feed roller 63 is advanced a distance corresponding to the stroke of the rack. After the crank pin 68 has passed its uppermost position the rocker 70 and the rack carried thereby drop downwards, and finally the rack is arrested by the stop screw 77, while the rocker 70 continues its downward stroke. The downward movement of the rack is assisted by a spring 78. The downward movement is ineffective as to the roller 63, because the pawl and ratchet mechanism 112, 113 is operative only during the upward stroke of the rack. The length of the feed of the web is varied by adjusting the screw 77. By screwing the said screw downwards the stroke of the rack and therefore the length of the feed of the web are increased, and vice versa. It will therefore be understood that the length of the feed can be adjusted without making any change in the gearing and while the apparatus is in operation.

Preferably the feed rollers 62 and 63, or at least the upper one of them which is in contact with the film side of the web, have a coating of rubber, and in order to prevent any slip of the web passing through the rollers the rollers are positively connected with each other by gear wheels 79 and 80.

The rollers are held in elastic engagement with each other by a spring 81 the tension of which can be regulated by a screw 82. In order that the web can not get between the gear wheels 79 and 80 the lower roller is formed at its ends with flanges 83 engaging in annular grooves 84 made in the upper roller. In addition the flanges prevent relative displacement of the rollers longitudinally of the axes thereof and rubbing of the rollers on the web which might be caused by such displacement, and finally they prevent access of the water pressed from the web to the gear wheels and the bearings of the lower roller, which water flows downwards along the flanges and into a gutter 85.

While the feed rollers 62, 63 are at rest printing takes place, while the web is held by the table 14, 15 in contact with the negative, and the shutters 7, 8 are rocked upwards and into exposing position. The operation of the shutters and the table is effected from a shaft 86 which carries the gear wheel 67 above referred to. At its opposite end the said shaft carries two cams 87 and 88, and the cam 87 cooperates with a roller 92 provided on a rail or slide 89. A rack 91 carried by said slide engages in the pinion 25 keyed to one of the ends of the shaft 23. As shown the rack is adjustable longitudinally of the slide 89 by means of a screw 90. The cam 87 is adapted to impart rotary rocking movement to the shaft 23 and the cam disks 22 keyed thereto so as to lift the table 14, 15 towards the negative. After the cam has passed the roller 92 the shaft 23 and the rail 89 are returned into initial position by gravity and by the springs 21. The cam 88 cooperates with a roller 93 provided on a rail or slide 94, which slide is jointed to a rocking lever 95. The upper end of the lever is in loose engagement with a rack 96 slidably mounted on the front wall of the box 6. As appears more particularly from Fig. 1, the said rack is formed at its ends respectively at its upper and lower sides with rack teeth 97 and 99 engaging with pinions 98 and 100 secured to the axis of the shutters 7 and 8 disposed within the box 6. When the slide 94 is shifted by the cam 88 the rack 96 is shifted accordingly, and as the teeth 97 and 99 are disposed on opposite sides of the pinions 98 and 100, the said pinions and the shutters connected therewith are rocked in opposite directions. For returning the mechanism into initial position a spring 101 is attached to the rack 96.

Figure 1:
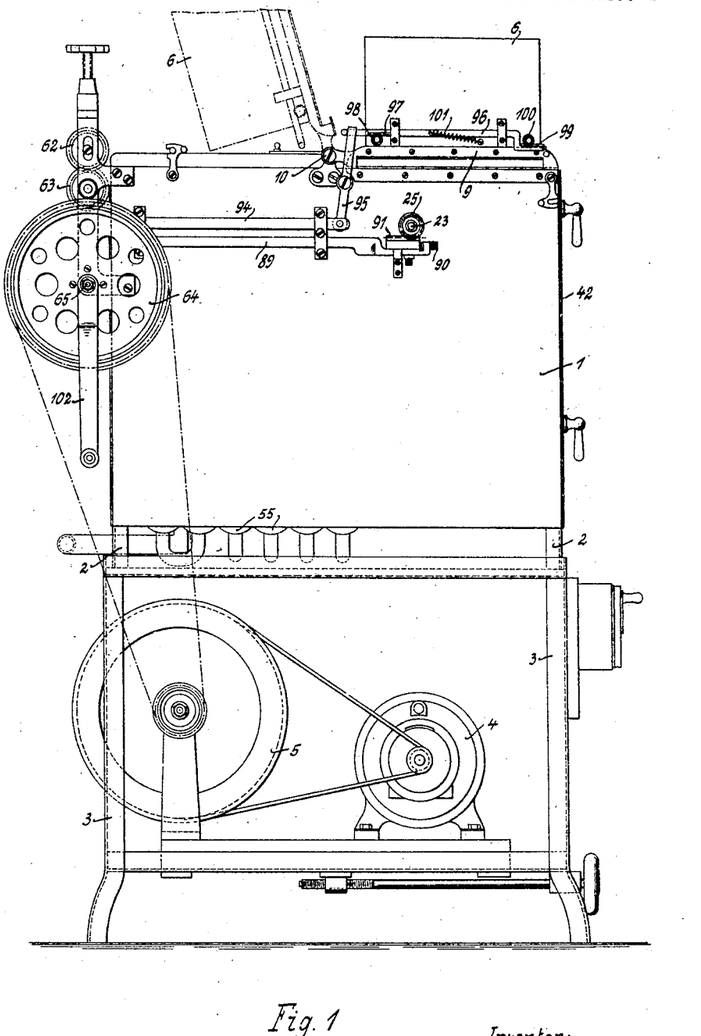
Fig. 1, is a front view of the apparatus.
Figure 2:
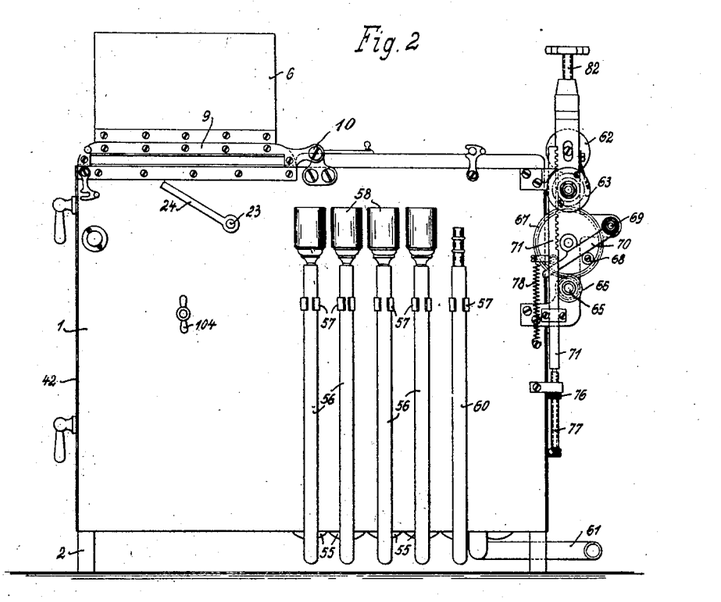
Fig. 2, is a rear view thereof.

The box 6 and the negative holder mounted thereon can be rocked about the axis 10 and away from the web as is shown in Fig. 1 in broken lines. Thereby the operation of the apparatus is facilitated. By reason of the loose engagement between the lever 95 and the rack 96 such rocking movement can be effected without loosening any part of the operating mechanism of the shutters.

Figure 9:
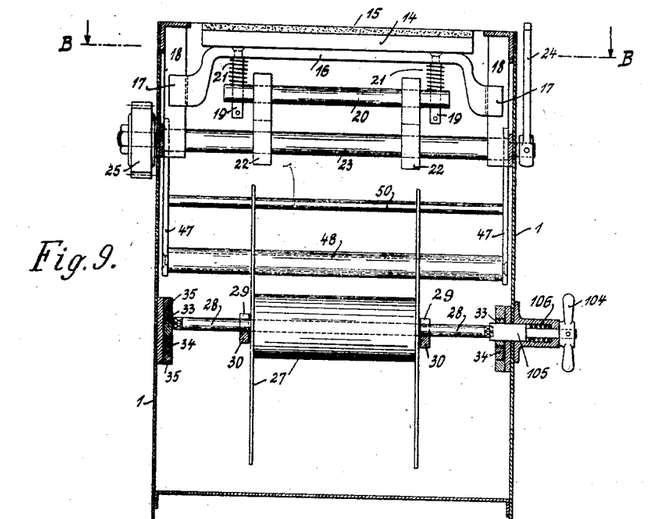
Fig. 9, is a cross-section taken on the line A—A of Fig. 3, Fig. 10, is a horizontal section taken on the line B—B of Fig. 9, Fig. 11, is a section taken on the line C—C of Fig. 10, Fig. 12, is a detail sectional view taken on the line D—D of Fig. 10 and showing one of the cam plates for operating the table for lifting the web of sensitized paper into contact with the negative.

As is shown in Fig. 9, the spindle is formed with a square end which is engaged by a shift bolt 105 provided with an outer wing 104 and acted upon by a spring 106. The said bolt and its wing take part in the rotation of the roll 27 and indicate by the velocity of the rotation when the web on the roll is exhausted, so that a new roll must be inserted.

The operation of the apparatus is as follows: A roll containing a web of sensitized paper is placed on the slide 33, 34, and the web or a strip secured thereto is passed over the table 14, 15, and through the dishes 51, 52, and 53 and the feed rollers 62, 63, whereupon the motor 4 is started for rotating the gear wheel 64, the shafts 65 and 86 and the gear wheel 67. Thereby the cam 87 rocks the cam disks 22 through the intermediary of the slide 89 and the pinion 25, so that the table 14 lifts the portion of the web located above the same into contact with the negative. Thereafter the cam 88 engages the roller 93, so that the shutters 7 and 8 are set in exposing position through the intermediary of the slide 94, the rocking lever 95, the rack 96, and the pinions 98 and 100. Now, the web of paper is exposed through the negative. After the cam 88 has passed the slide 94, the shutters 7, 8 are returned into closing position, while the cam 87 holds the table 14, 15 in elevated position until the shutters are completely closed. When the slide 89 is released from the cam 87 the table 14, 15 moves downwards so as to release the web. Now the crank pin 68 becomes operative, and it lifts the rack 71 by means of the rocker 70 and the pin 72. Thereby the feed rollers 62 and 63 advance the web of paper a distance corresponding to the stroke of the rack 71. When the crank pin 68 is in its uppermost position the feeding movement is interrupted and the rocker 70 and the rack 71 return into initial position. In the meantime the cams 87 and 88 have been brought into position for operating the slides 89 and 94.

Should it be found that the paper feed does not correspond to the length of the negative, it is regulated by adjusting the screws 77, which can be done without arresting the apparatus. The time of the exposure is varied by regulating the speed of the motor 4. For a very slow operation of the apparatus a hand operated crank 102 is provided which is keyed to the shaft 65.

While in describing the invention reference has been made to a particular example embodying the same, I wish it to be understood that my invention is not limited to the construction shown in the drawings, and that various changes may be made in the general arrangement of the apparatus and the construction of its parts without departing from my invention.

I claim:

1. In a photographic printing apparatus, the combination, with the support for the negative, of means to move a web of sensitized paper along said support, said means comprising a pair of feed rollers, rotary driving means, a rocker operatively connected with said driving means, an automatically retracted rack loosely connected with said rocker, adjustable means for limiting the stroke of said rack when being automatically retracted, and a pinion in engagement with said rack and connected with said rollers for rotating the same when moving in one direction and inoperative when moving in the opposite direction.

2. In a photographic printing apparatus, the combination, with the support for the negative, a shutter adapted to cover the negative, operating mechanism therefor, means comprising a pair of feed rollers to move a web of sensitized paper along the negative, and a member for moving said web into contact with the negative, of a rotary driving member, and longitudinally shiftable members controlled by said driving member and operatively connected one with the operating mechanism for the shutter, another one with the means for moving the web, and a third one with said member for moving the web into contact with the negative.

3. In a photographic printing apparatus, the combination with a negative and a support therefor, a table below the support, mounted for reciprocating movement toward and away from the same, a roll for holding the sensitized fabric, revolubly mounted below the table, means for guiding the fabric between the support and the table and means for moving the sensitized fabric and the table in cyclic order, including a cam member for moving the table, a pivoted lever adapted to bear against the roll, and means yieldingly interconnecting the cam and the lever.

4. In a photographic printing apparatus, the combination with a support for the negative, a table below the support, mounted for reciprocating movement toward and away from the support, shutter mechanism above the support to cover and expose a negative, a roll for holding the sensitized fabric, means for guiding the sensitized fabric between the table and the support, a pair of rollers for moving the sensitized fabric, means for operating the shutter mechanism, means for moving the table and mechanism for correlating the movement of the rollers, the table and the shutter mechanism, including gear mechanism driving the rollers in one direction but free to turn in opposite direction independently of the rollers, a rack mounted for reciprocating movement in engagement with said gear mechanism, means for moving the rack in gear-driving direction, independent means for returning the rack and means for adjustably limiting the return movement.

5. In a photographic printing apparatus, the combination with a pair of rollers for intermittently moving a strip of fabric, of gear mechanism connected with the rollers to drive the same in one direction and independent of the movement thereof in opposite direction, a rack mounted for reciprocating movement in engagement with the gear mechanism, cam mechanism for moving the rack in gear-driving direction, independent means for returning the rack and means for adjustably limiting the return movement of the rack.

6. In a photographic printing apparatus, the combination with a support for the negative, of a table mounted for movement toward and away from the support, a roll of sensitized fabric, and means for intermittently moving the sensitized fabric and the table in cyclic order, comprising cam mechanism operative to move the table, brake mechanism adapted to act upon the roll and means whereby movement of the table toward the support for the negative is translated to actuate the brake mechanism to arrest movement of the roll.

In testimony whereof I hereunto set my hand in the presence of two witnesses.

KARL SCHMIDT.

Witnesses:
 FRANK REINHARD,
 GERTRUD SCHWERZ.